United States Patent [19]

Heinze et al.

[11] Patent Number: 4,609,600
[45] Date of Patent: Sep. 2, 1986

[54] ELECTROCHEMICAL CELL CONTAINING ELECTRODE MADE OF POLYMERIC COMPOUND AND ELECTROLYTE CONTAINING ORGANIC COMPLEX LIGAND

[75] Inventors: Jürgen Heinze, Freiburg; John Mortensen, Stegen, both of Fed. Rep. of Germany

[73] Assignee: BASF Aktiengesellschaft, Ludwigshafen, Fed. Rep. of Germany

[21] Appl. No.: 704,327

[22] Filed: Feb. 22, 1985

[30] Foreign Application Priority Data

Feb. 23, 1984 [DE] Fed. Rep. of Germany ....... 3406472

[51] Int. Cl.⁴ .......................................... H01M 10/40
[52] U.S. Cl. .................................. 429/197; 429/198; 429/201; 429/213
[58] Field of Search ............... 429/213, 196, 197, 199, 429/198, 194, 201

[56] References Cited

U.S. PATENT DOCUMENTS 4,321,114  3/1982  MacDiarmid et al. ............. 204/2.1
4,442,187  4/1984  MacDiarmid et al. ............. 429/213

FOREIGN PATENT DOCUMENTS 1155914  10/1983  Canada .
1155913  10/1983  Canada .
0058469   1/1982  European Pat. Off. .
2352161   6/1980  Fed. Rep. of Germany .

Primary Examiner—Anthony Skapars
Attorney, Agent, or Firm—Keil & Weinkauf

[57] ABSTRACT

An electrochemical cell or battery contains two or more electrodes, the active material of one or more of the electrodes consisting of an electrically conductive, electrochemically oxidizable and/or reducible polymer. The electrolyte consists of one or more ionic or ionizable compounds, as conductive salts, dissolved or suspended in an organic electrolyte solvent, the electrolyte containing one or more organic complex ligands possessing ethylene glycol ether units.

3 Claims, 2 Drawing Figures

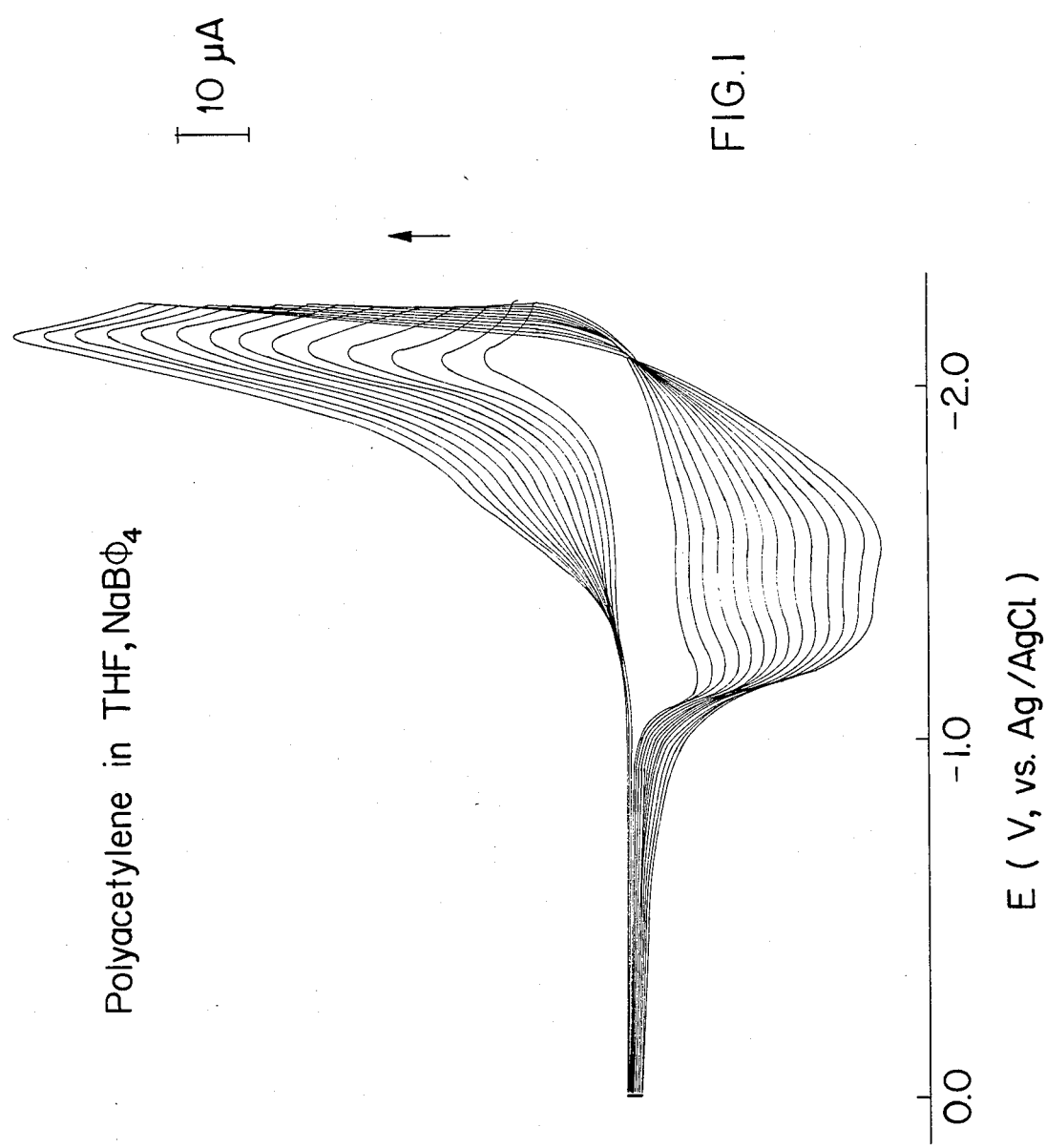

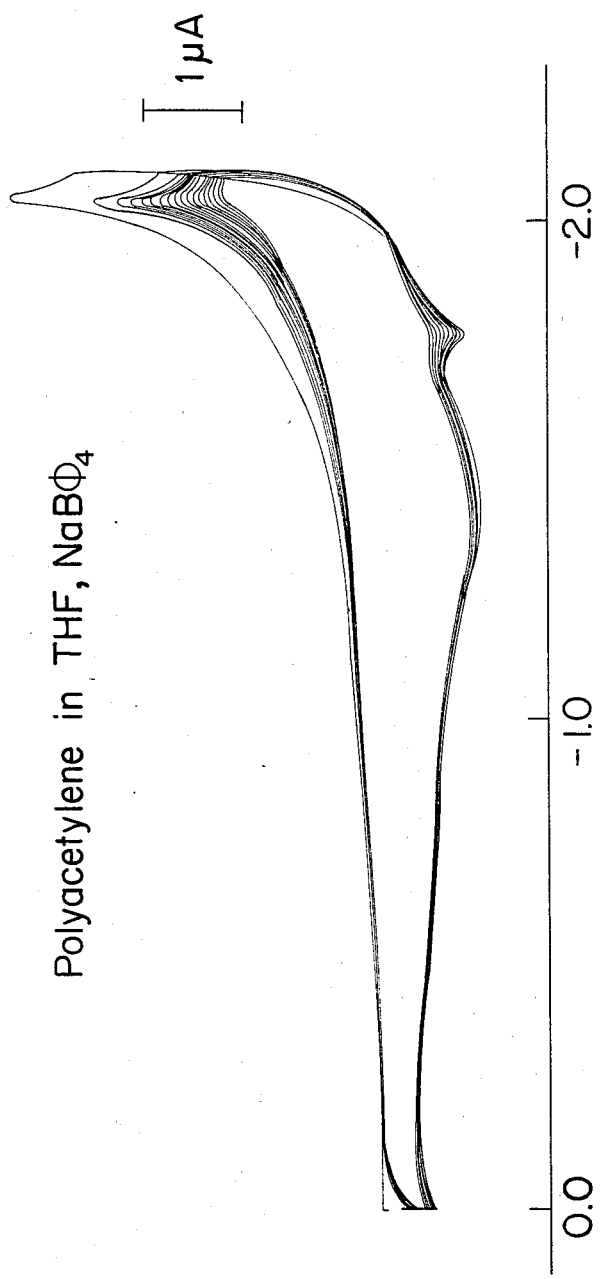

ELECTROCHEMICAL CELL CONTAINING ELECTRODE MADE OF POLYMERIC COMPOUND AND ELECTROLYTE CONTAINING ORGANIC COMPLEX LIGAND

The present invention relates to electrochemical cells, in particular electrochemical storage cells which contain two or more electrodes and an electrolyte consisting of, as conductive salts, one or more ionic or ionizable compounds dissolved or suspended in an organic electrolyte solvent, wherein one or more of the electrodes contain an electrochemically, and preferably reversibly, oxidizable and/or reducible polymer having an electrical conductivity greater than $10^{-2} \Omega^{-1} cm^{-1}$ as active electrode material, or consist of such a polymer.

EP-A-36 118, EP-A-49 970, EP-A-50 441 and EP-A-58 469 describe lightweight batteries of high energy density and power density which contain a highly electrically conductive p- or n-doped conjugated polymer, in particular polyacetylene, as the active material of the cathode and/or anode. The conjugated polymers can be reversibly doped and dedoped electrochemically with the ionic or ionizable compounds present in the electrolyte, and can thus be converted to various oxidation or reduction states, depending on the degree of doping. In a typical and advantageous embodiment, these batteries contain, for example, a lithium anode and a cathode consisting of n-doped polyacetylene. The electrolyte salts, eg. lithium perchlorate, lithium hexafluoroarsenate, lithium hexafluoroantimonate or lithium hexafluorophosphate, are preferably dissolved in organic electrolyte solvents. The electrolyte solvents stated in these publications are, in particular, linear and cyclic ethers, such as ethylene glycol dimethyl ether, diethylene glycol dimethyl ether, solid polyethylene oxide, tetrahydrofuran or dioxane, as well as propylene carbonate, lactones, eg. γ-butyrolactone, sulfones, eg. sulfolane or substituted sulfolanes, and organic sulfites, eg. dimethyl sulfite.

To date, it has not been possible to produce batteries, based on electrically conductive doped conjugated polymers, which satisfy all of the requirements which batteries have to meet in practice. For example, many of these batteries exhibit undesirable self-discharge, which has a very adverse effect on their shelf life. The cycle life, i.e. the number of possible charging and discharging processes in secondary cells, is also frequently unsatisfactory. After a large number of cycles, the energy density and power density of some of these batteries decrease sharply and irreversibly. Many of the deficiencies of these batteries are related to the electrolyte system used. In the frequently preferred embodiment of the batteries, a lithium anode and a cathode consisting of the electrically conductive conjugated polymers are used.

It is an object of the present invention to provide electrochemical cells or batteries which contain one or more electrodes based on electrically conductive, electrochemically oxidizable and/or reducible polymers and, in addition to having a high packing density and high energy density, exhibit reduced self-discharge and hence possess an improved shelf life, permit a very high discharge and give a large number of cycles with high cycle stability, i.e. even after repeated discharging and recharging, the current delivered and the cell voltage should not have changed significantly; furthermore, both electrodes may consist of the electrochemically oxidizable and reducible polymer.

We have found that this object is achieved if, in the electrochemical cells or batteries of the type stated at the outset, the electrolyte used contains an organic complex ligand possessing units of the general formula

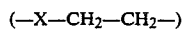

where X is O, S or NH.

BRIEF DESCRIPTION OF THE DRAWINGS

FIG. 1 is a result of the cycling experiment according to the invention.

FIG. 2 is the cycling curve without the use of a crown ether.

The present invention accordingly relates to an electrochemical cell or battery containing two or more electrodes and an electrolyte consisting of a solution or suspension of an ionic or ionizable compound, as a conductive salt, in an organic electrolyte solvent which is inert to the electrodes, one or more of the electrodes containing, as active electrode material, an electrochemically oxidizable and/or reducible polymer which, in the oxidized and/or reduced state, has an electrical conductivity greater than $10^{-2} \Omega^{-1} cm^{-1}$, or consisting of such a polymer, wherein the electrolyte contains an organic complex ligand possessing ethylene glycol ether units.

The present invention furthermore relates to special embodiments of this electrochemical cell or battery, as described in detail below.

Hence, compared with similar conventional batteries, the novel electrochemical cells and batteries not only have a better energy density and a better power density but also permit a high discharge. In spite of possible closer packing of the electrodes, the novel electrochemical cells and batteries exhibit lower current and voltage losses. Moreover, self-discharge is substantially reduced, particularly in comparison with similar conventional batteries of this type, so that the novel electrochemical cells or batteries have an improved shelf life. They can also be recharged, permit a large number of cycles and have high cycle stability. In addition, both electrodes can consist of the electrochemically oxidizable and/or reducible polymer. It is surprising that, when organic complex ligands are used as additives in the electrolyte, n-doping of electrically conductive polymers can be carried out particularly readily, i.e. the polymers are made the cathode during charging, and the anode during discharging.

The novel electrochemical cells or batteries contain electrolytes as described in, inter alia, EP-A-36 118, EP-A-49 970 or EP-A-58 469. Examples of other such conventional organic electrolyte solvents are dimethoxyethane, diethylene glycol dimethyl ether, tetrahydrofuran and its derivatives, propylene carbonate, γ-butyrolactone and its derivatives, N-methylpyrrolidone, acetonitrile, dimethylformamide, dimethyl sulfoxide, sulfolane and its derivatives, ethylene sulfite and dimethyl sulfite. Thus, the aprotic solvents are preferred. The electrolyte solvents employed should be inert to the selected electrode materials and should be stable to chemical decomposition in the voltage range in which the electrochemical cell or battery is operated.

The electrolyte systems of the novel electrochemical cells or batteries contain one or more ionic or ionizable compounds dissolved or suspended in the electrolyte solvent, these compounds, as conductive salts, serving in particular to transport current within the electrochemical cell or battery during operation of the said cell or battery. Preferably, the ionic or ionizable compound, which for the sake of simplicity is referred to below as the conductive salt, is partially or completely, in particular completely, dissolved in the electrolyte solvent. The electrolyte solvent imparts high ionic mobility to the ions of the conductive salt during operation of the electrochemical cell or battery, so that, as a rule, the said cell or battery can be not only discharged but also recharged. It should however be noted that, for this purpose, the electrolyte must be of a form which is known per se and which permits the reversible oxidation and/or reduction of the electrically conductive polymers used as electrode material, without electrode material or electrolyte being removed irreversibly from the battery system as a result. The conductive salts are present in the electrolyte solvent in general in amounts of 0.01–2 moles per liter of electrolyte solvent.

Suitable conductive salts for the electrolytes are the ionic or ionizable alkali metal or alkaline earth metal compounds which are described in the literature and conventionally used for electrochemical cells or batteries of the type under discussion. These include, in particular, the salts possessing perchlorate, tetrafluoborate, hexafluoroarsenate, hexafluoroantimonate or hexafluorophosphate anions. Other very useful salts are those of sulfonic acids, in particular of aromatic sulfonic acids which are unsubstituted or substituted by alkyl and/or nitro, in particular benzene sulfonates or tosylates, well as fluorosulfonates, e.g. trifluoromethanesulfonate. Particularly suitable cations for the conductive salts are the alkali metal cations, preferably $Li^+$, $Na^+$ or $K^+$. Other very useful cations for the conductive salts include alkaline earth metal ions and tetraalkylammonium ions, preferably tetraalkylammonium ions, particularly preferably tetrabutylammonium, tetraethylammonium or tetramethylammonium.

When the negative electrode in the novel electrochemical cells or batteries, as described in detail below, consists of a metal having a high oxidation potential, in particular an alkali metal, the conductive salt is preferably a salt of the metal constituting the negative electrode, particularly in the case of secondary cells. If, for example, the electrochemical cells or batteries contain lithium metal or a lithium alloy as the negative electrode, the conductive salts used are, in particular, lithium salts, preferably the perchlorate, tetrafluoborate, hexafluoroarsenate, hexafluoroantimonate or hexafluorophosphate.

The electrolyte of the electrochemical cells or batteries can contain one conductive salt or a mixture of several conductive salts.

The useful and preferred conductive salts for the novel electrochemical cells or batteries also include lithium perchlorate, sodium perchlorate, lithium tetrafluoborate, sodium tetraphenylborate, lithium hexafluoroarsenate, lithium hexafluoroantimonate, lithium hexafluorophosphate, etc.

The organic complex ligands containing ethylene glycol ether units which, according to the invention, are present in the electrolyte in the electrochemical cells or batteries are crown ethers, cryptands or podands. Compounds of this type are described by F. Vögele and E. Weber in the paper on "Neutrale organische Komplexliganden und ihre Alkali-komplexe I-Kronen-Äther, Cryptanden, Podanden" in "Kontakte", Part 1/77, line 11 et seq. Organic complex ligands of this type are also described by C. J. Pedersen in "Cyclic polyethers and their complexes with metal salts" (J. Am. Chem. Soc. 89; 26 (December 1967), pages 7017–7036. These publications and the nomenclature used therein are hereby incorporated by reference.

Crown ethers, such as 15-crown-5 (1,4,7,10,13-pentaoxacyclopentadecane), 2-crown-4 (1,4,7,10-tetraoxacyclodecane), 18-crown-6 (1,4,7,10,13,16-hexaoxacyclooctadecane) and dibenzo-18-crown-6 are particularly suitable.

The organic complex ligands are present in the electrolyte solvent in general in amounts of about 0.05–2 moles per liter of solvent.

The stated organic complex ligands form complexes with the cation present in the electrolyte.

In crown ether complexes, it is frequently found that a ligand molecule contains a cation, the latter being present in the cavity of the crown ether. In the case of cryptands, the cation is contained in the three-dimensional cavity of the molecule. In the case of podands, the chains of the molecules are wrapped spirally or cyclically around the cation. In this context, reference may be made to the abovementioned publications.

The use of such organic complex ligands in anhydrous electrolytes is disclosed in German Laid-Open Application No. DE-OS 2,852,161. However, the fact that electrolytes which contain these compounds are particularly suitable for electrochemical cells or batteries containing electrochemically oxidizable and/or reducible polymers as electrodes, as described here, is not indicated in this publication. In particular, the fact that the electrochemical stability as well as the reversibility of the polymer methods are considerably improved by adding complex ligands was unknown to date.

The novel electrochemical cells or batteries contain, as active material of one or more electrodes, an electrochemically, and preferably reversibly, oxidizable and/or reducible polymer which, in the oxidized and/or reduced state, has an electrical conductivity greater than $10^{-2}$, in particular greater than or equal to 1, $\Omega^{-1}$ cm$^{-1}$. Such polymers include, in particular, the conjugated polymers which are p- or n-doped or which can be electrochemically p-doped or n-doped.

For the purposes of the present invention, conjugated polymers are those polymers which possess conjugated unsaturated bonds along their polymer main chain. These include all known conjugated polymers which are doped or can be doped and which are electrochemically oxidizable and/or reducible, as described in the literature and in particular in EP-A-36 118, EP-A-49 970 and EP-A-58 469.

Preferred active electrode materials from the group consisting of the doped or dopable conjugated polymers include the acetylene polymers, in particular polyacetylene itself, the conventional substituted polyacetylenes and acetylene copolymers. For use as active electrode material, the acetylene polymers can be p-doped with electron acceptors or n-doped with electron donors. During the operation of the electrochemical cell or battery, the degree of doping of these doped acetylene polymers is altered; in particular, they are substantially or completely dedoped, with the result that the oxidation state and the oxidation potential of the polymers change. It is also possible to use undoped acetylene polymers as active electrode material; in this case, these acetylene polymers are p- or n-doped during the operation of the electrochemical cell, in particular during charging, but also during discharging, of the battery, with the result that the electrical conductivity of the acetylene polymers increases at the same time.

Among the doped, electrochemically oxidizable conjugated polymers, the pyrrole polymers have also proven very advantageous as electrode material. The pyrrole polymers include, very generally, the homopolymers and copolymers of compounds from the class consisting of the pyrroles. Compounds from this class are pyrrole itself as well as the substituted pyrroles, in particular the pyrroles which are monoalkyl-substituted, dialkyl-substituted, monohalogen-substituted or dihalogen-substituted at the carbon atoms. The homopolymers of unsubstituted pyrrole itself, and the copolymers of unsubstituted pyrrole with substituted pyrroles and/or other comonomers, are preferred. Examples of suitable further comonomers are cyclopentadiene, azulene and its derivatives, fluvene, indene and quadratic acid. Other heterocyclic compounds, such as imidazole, thiazole, furan, thiophene, 2-bromothiophene, 2,6-dimethylpyridine or pyrazine, are also useful comonomers. The copolymers of pyrrole contain in general from 50 to 99, preferably from 75 to 99, % by weight of unsubstituted pyrrole and from 1 to 50, preferably from 1 to 25, % by weight of substituted pyrroles and/or other comonomers. As a consequence of their preparation, which is generally carried out electrochemically by anodic oxidation of the monomers, the pyrrole polymers are already p-conducting compounds having electrical conductivities of in general from 1 to $10^2 \Omega^{-1} cm^{-1}$. In general, the pyrrole polymers which are suitable for electrode materials and electrochemical cells are known as such and are adequately described in the literature.

In addition to the doped and/or electrochemically dopable or dedopable conjugated polymers, electrically conductive polymers having an electrical conductivity greater than $10^{-2} \Omega^{-1} cm^{-1}$ which have proven particularly advantageous are those which contain electrochemically oxidizable and/or reducible redox groups which possess a defined structure and are capable of forming two or more stable oxidation states which are preferably reversibly interconvertible. Such polymers which are particularly useful as electrode materials for electrochemical cells or batteries are described in detail in, for example, DE-A-32 44 900, which in this context is hereby incorporated by reference. These electrically conductive redox polymers include p- or n-doped conjugated polymers, in particular p- or n-doped polyenes, preferably acetylene polymers which contain the redox groups as side groups bonded to the polymer main chain. These redox groups are mainly groups which are capable of forming quinoid structures, 1,9-disubstituted phenalene radicals being very advantageous redox groups. It is also possible for the electrochemically oxidizable and/or redox groups possessing a defined structure to be present in the main chain of the electrically conductive redox polymers. This class of redox polymers includes, for example, poly(quinonimines) and poly(quinonediimines), such as aniline black, and polyindigo and its analogs, and polyindophenines. Polyphthalocyanines and polyquinolines are also suitable.

The electrically conductive, electrochemically oxidizable and/or reducible polymers can be used in any suitable form as active electrode material in the novel electrochemical cells or batteries. For example, it is possible to employ these polymers in the form of self-supporting films or sheets or of foamed open-cell moldings or foams. This is preferable, for example, particularly when these polymers are capable of forming stable, solid, self-supporting films or sheets. In this case, the electrode in question consists of the electrically conductive, electrochemically oxidizable and/or reducible polymers.

When used as electrode material in the electrochemical cells or batteries, the polymers can equally well be applied on a substrate, for example by laminating films or sheets of these polymers with the substrate or by powder-coating the substrate with the polymer. The substrates used can be inert bases, e.g. films or sheets of conventional polymers which are stable under the operating conditions of the electrochemical cell or battery, in particular woven fabrics, nonwovens, etc., consisting of organic or inorganic, electrically nonconductive materials, e.g. glass mats or the like, which can simultaneously serve as separators or diaphragms. However, it is also possible to use electrically conductive substrates, for example sheets or films of metals, e.g. platinum, palladium, gold, silver, tantalum or stainless steel. When the electrically conductive, electrochemically oxidizable and/or reducible polymers are applied on an electrically conductive substrate, the latter can, for example, simultaneously serve as a conductor for the electrode.

Furthermore, the said polymers can be used for the production of the electrodes in the form of sintered or pressed powders, for example as sintered or pressed plates. In the production of pressed or self-baking electrodes, the conventional additives can be concomitantly used, e.g. binders, pigments, carbon black, inert metals or base or matrix materials, such as other polymeric substances. These additives are present in the electrode materials in general in amounts of not less than 50% by weight, based on the total electrode, the electrode preferably being produced without employing these additives. It is also possible to use the electrically conductive, electrochemically oxidizable and/or reducible polymers in wire-gauze electrodes or cage electrodes.

The novel electrochemical cells or batteries possess two or more electrodes, i.e. one or more positive electrodes (cathodes) and one or more negative electrodes (anodes). The active electrode material of one or a plurality of these electrodes, i.e. the cathode and/or the anode, consists of the electrically conductive, electrochemical oxizable and/or reducible polymers. Possible combinations of active cathode material and active anode material, and hence the embodiments of the novel electrochemical cells and batteries, can vary within a wide range.

In one embodiment of the novel electrochemical cells or batteries, only the active anode material consists of an electrically conductive, electrochemically oxidizable and/or reducible polymer. In this case, the cathode can consist of any suitable conventional cathode material. Metals whose oxidation potential is less than that of the polymer used for the active anode material are particularly suitable for this purpose. Examples of metals which are preferably used as cathode material in this case are platinum, palladium, gold, silver, nickel, titanium and the like. However, it is also possible to use, for example, a carbon electrode as the cathode. In this embodiment of the electrochemical cells or batteries, preferred active anode materials, when the batteries are in the charged state, are electrically conductive, n-doped acetylene polymers or electrically conductive polymers containing redox groups of defined structure.

In the novel electrochemical cells or batteries, both the active cathode material and the active anode material can consist of electrically conductive, electrochemically oxidizable and/or reducible polymers, the oxidation state of the polymer used as active cathode material being higher than that of the polymer employed as active anode material. In this case, a large number of variations are possible, as described in detail in, for example, EP-A-36 118. It has proven particularly advantageous if the active anode material and the active cathode material consist of different polymers.

The novel electrochemical cells or batteries can be produced in an extremely large variety of forms. The electrolyte solvent used according to the invention makes it possible for the electrodes of the electrochemical cells or batteries to be packed very closely, thereby favoring, in particular, the construction of very small, thin, lightweight, flexible batteries. In the said cells or batteries, the anode and the cathode can be separated from one another by diaphragms or separators, e.g. filter paper, glass frits, porous ceramic materials or porous or semipermeable polymeric materials. The batteries can be assembled in the charged or uncharged state.

In addition to their light weight and their high energy density and power density the novel electrochemical cells or batteries are distinguished in particular by their great stability and long cycle life and the fact that they exhibit little self-discharge. The batteries can be used, in particular, as secondary cells, their properties remaining essentially unchanged and constant even after a very large number of recharging processes. Primary batteries according to the invention exhibit little self-discharge, so that their capacity is retained over a prolonged period.

The Examples which follow illustrate the invention. Parts and percentages are by weight, unless stated otherwise.

EXAMPLE 1

An electrochemical cell was constructed in which two polyacetylene electrodes were suspended in a cell body consisting of polymethyl methacrylate. The electrodes were 1 cm apart and had an area of 2.0 cm$^2$. The cell body was filled with an electrolyte based on propionitrile, in which sodium tetraphenylborate and the crown ether 15-crown-5 (1,4,7,10,13-pentaoxacyclopentadecane) were dissolved, both in 0.1 molar concentration. The cell body was sealed so that it was airtight, and the cell was charged for 8 minutes with a charging voltage of 3 volt, after which it was discharged through a resistance. This process was repeated several times. In the course of from 80 to 90 cycles, the capacity of the cell increased so that the electrodes were laden with 15 mol %, based on (CH), of the dopant. During a further 50 cycles, the electrodes exhibited a constant loading of 15 mol %.

When a procedure similar to that described above was employed but no crown ether was used in the electrolyte, the electrodes could be laden with only 6.5 mol %, based on (CH), of the dopant. Furthermore, it was found that the charging capacity decreased after only two or three cycles.

Using a procedure identical to that described above in the first paragraph of this Example, it was also possible to use sodium hexafluorophosphate, lithium hexafluorophosphate or lithium tetrafluoborate as the conductive salt. Furthermore, suitable crown ethers were 12-crown-4, and 18-crown-6.

EXAMPLE 2

Cycling experiments were carried out an an electrochemical cell as described in Example 1, the electrolyte of the cell containing tetrahydrofuran in which the crown ether 15-crown-5 and sodium tetraphenylborate (as the conductive salt) were dissolved, both in 0.1 molar concentration. The cyclic voltametry method used here is described in principle in Physical Methods of Chemistry, Part IIA-Electrochemical Method, edition Arnold Weissberger, Wiley-Interscience publishers, 1971, New York, London, Sydney, Toronto, on pages 423–530. A polyacetylene-coated platinum electrode was used as the cathode, and the anode used consisted of platinum. A silver/silver chloride electrode was employed as the reference electrode. The result is shown in FIG. 1.

When the same procedure was employed, but without the use of a crown ether in the electrolyte, the cycling curve was as shown in FIG. 2. These Figures show that, for the novel embodiment of the cell, the capacity increases with the number of cycles. Moreover, the capacity of the unit is substantially higher than the capacity obtained when a crown ether is omitted.

We claim:

1. An electrochemical cell or battery containing two or more electrodes and an electrolyte consisting of a solution or suspension of an ionic or ionizable compound, as a conductive salt, in an organic electrolyte solvent which is inert to the electrodes, one or more of the electrodes containing, as active electrode material, an electrochemically oxidizable and/or reducible polymer which, in the oxidized and/or reduced state, has an electrical conductivity greater than $10^{-2}\Omega^{-1}$ cm$^{-1}$, wherein the electrolyte contains an organic complex ligand possessing units of the formula

where X is O, S or NH.

2. An electrochemical cell or battery as claimed in claim 1, wherein the organic complex ligand used is a crown ether, a cryptand or a podand.

3. An electrochemical cell or battery as claimed in claim 1, wherein the complex ligand is present in a concentration of from 0.05 to 2 moles per liter of electrolyte solvent.

* * * * *